United States Patent [19]

Lowther

[11] 4,038,165
[45] July 26, 1977

[54] CORONA REACTION METHOD

[75] Inventor: Frank Eugene Lowther, Severna Park, Md.

[73] Assignee: Union Carbide Corporation, New York, N.Y.

[21] Appl. No.: 632,580

[22] Filed: Nov. 17, 1975

Related U.S. Application Data

[63] Continuation-in-part of Ser. No. 558,046, March 13, 1975.

[51] Int. Cl.² .................................................. C01B 13/11
[52] U.S. Cl. ........................................ 204/176; 204/164
[58] Field of Search .................. 204/176; 250/532–541

[56]  References Cited

U.S. PATENT DOCUMENTS

| | | | |
|---|---|---|---|
| 3,833,492 | 9/1974 | Bollyky | 204/176 |
| 3,883,413 | 5/1975 | Douglas-Hamilton | 204/176 |

FOREIGN PATENT DOCUMENTS

| | | | |
|---|---|---|---|
| 689,301 | 6/1964 | Canada | 250/541 |

*Primary Examiner*—F.C. Edmundson
*Attorney, Agent, or Firm*—Eugene Lieberstein

[57]  ABSTRACT

Corona discharge reactions are efficiently conducted by passing a reactant gas through a corona discharge gap in which pulsed electrical energy is dissipated to accelerate electrons to a productive energy level, and eliminating gas ions from the gap to minimize non-productive energizing of the ions prior to additional corona discharge. In one preferred practice of the process a selective ion neutralization potential is applied to eliminate the non-productive gas ions between corona pulses. In other preferred practices, a reactant gas which is exposed to corona is removed from the corona zone after limited exposure to corona to permit recombination of the heavy gas ions prior to additional exposure to corona and/or an ion neutralizing component is added to the reactant gas stream.

17 Claims, 7 Drawing Figures

CORONA REACTION METHOD

This application is a continuation-in-part of application Ser. No. 558,046, filed March 13, 1975.

The present invention relates to corona reaction systems, and more particularly to method and apparatus which may be used to increase the electrical efficiency of corona induced chemical reactions.

It is well known that many chemical reactions, such as the conversion of oxygen to ozone, may be effectively conducted in the presence of an electrical corona discharge. While it is found that high voltage corona is in many instances a convenient means by which to induce chemical reactions, corona discharge processes are extremely inefficient in terms of electrical energy required per unit of desired reaction product produced. For example, in the case of ozone produced from oxygen, the theoretical energy required to produce a Kg of ozone is 0.97 KWH per Kg while in practice it is found that about 6.6 KWH per Kg are needed with oxygen feed and 17.0 KWH/Kg with dry air feed.

Prior workers have attempted to decrease the amount of energy required to produce a corona reaction by varying many of the operational parameters of the corona generation system. For example, it is known that the use of pulsed high voltage energy having a pulse duration of 1 microsecond and a frequency as high as 1 KHz will more efficiently decompose carbon dioxide than a conventional 60 Hz AC waveform. However, it has also been shown that the use of an extremely high frequency corona power in the radiofrequency range, that is, 1–20 MHz, does not result in increased efficiency in the production of ozone.

While the prior art suggests that changes in efficiency may be obtained in corona induced chemical reactions by the manipulation of frequency and waveform, it has been found that these attempts have resulted in processes that shown no improvement and are in fact impractical from the commercial standpoint. This is primarily due to the fact that the use of high frequencies and voltages result in the production of excess heat which is unmanageable when large scale operation and high unit capacities which require high power densities per unit of electrode surface are contemplated.

It is therefore an object of the present invention to provide an improved corona discharge system.

It is a further object to provide a method by which the overall electrical energy required to produce a corona discharge chemical reaction may be minimized.

It is still a further object to provide a means by which the amount of excess heat which results from a corona discharge reaction process is substantially decreased.

It is yet another object to provide a method by which the operation and equipment parameters involved in a corona discharge chemical reaction system may be optimized to produce maximum product and minimum waste heat.

It is still a further object to provide an improved corona generator system which will make feasible corona reaction processes which are conducted at high unit capacities and maximum electrical efficiencies.

It is still another object to provide an improved ozone generation system which is capable of efficiently producing ozone in large quantities from an oxygen containing reactant gas, such as air, which contains considerable quantities of moisture and other impurities.

It is still a further object to provide economical, reliable, high voltage, high frequency narrow pulse power supplies which are capable of driving large size corona generators to produce commercial quantities of ozone.

It is still yet another object to provide a system by which ozone may be safely generated in concentrations of 10 percent by weight without undue decomposition of ozone.

These and still further objects of the present invention will become readily apparent to one skilled in the art from the following detailed description and drawings wherein.

Broadly, my invention comprises a method for increasing the electrical efficiency of a corona discharge reaction system, and correspondingly substantially reducing the amount of waste heat produced thereby, wherein a narrow pulse high voltage waveform is applied to a gas filled corona discharge gap along with means to remove gas ions from the gap.

More specifically, I have invented a corona reaction system wherein the corona is produced in a gas filled gap between opposing electrodes by a high voltage, narrow pulse electrical discharge in which the electrical pulse width is less than the gas ion transit time between the electrodes, and wherein means are produced to remove or neutralize the gas ions which are formed during the discharge in a manner which minimizes the electrical energy which is normally wasted in the acceleration of the ions.

In a particularly preferred practice of my invention a low voltage bias potential is maintained between the electrodes which is sufficient to substantially remove gas ions from the gap in the time interval between pulses. Additional means or methods for removing gas ions from the discharge gap before an excessive amount of energy is expanded in the acceleration thereof include removing the gas from the gap after exposure to a limited number of narrow pulses and holding the gas in a non-corona zone to permit recombination, i.e. neutralization, of the ions before exposing the gas to additional corona discharge. It is also envisioned that gas ions may be neutralized within the gap by selective application of an added neutralizing component such as negatively charged finely divided liquid or solid particles such as silica gel, water and carbon black having a particle size of less than about 0.1 micron, and preferably on the order of 0.001 to 0.01 microns. To obtain the negatively charged neutralization component, a finely divided solid is passed through an electrical field which is created by a pair of oppositely charged plates such as used in electrostatic precipitators. Alternatively, an atomized liquid such as water may be used wherein water is dispersed as an aerosol having droplets on the order of about 0.01 micron. Electrical neutralization of non-productive gas ions may also be achieved by application of a minor energizing electrical pulse of a polarity opposite to that of the corona pulse. The application of the bias potential may be advantageously applied to the corona discharge electrodes of a corona cell or to a grid which is placed between the electrodes.

In most conventional corona discharge systems the high voltage electrical potential is applied across the discharge gap in the form of relatively wide electrical pulses. Typically, the electrical energy waveform is a conventional sine wave, while in other instances pulse energy having a pulse duration of 1 to 200 microseconds ($\mu$sec) have been utilized.

It is observed that these prior art systems are extremely inefficient and that 90 to 99% of the electrical energy is wasted in the form of excess heat. I have determined that the excess heat generated in these conventional systems may be attributed to the kinetic energy which is imparted to the charged gas molecules (ions) which are present in the corona discharge gap. The electrons which are responsible for the formation of the desired reaction product are formed and accelerated to reaction potential during the initial part of the conventional electrical power pulse. The remainder of the pulse supplies kinetic energy to the charged gas molecules which result from the formation of electrons and which do not contribute to the formation of reaction product. These ionized gas molecules dissipate their kinetic energy is nonproductive collision which appears as waste heat in the reaction system.

In my process I have substantially reduced the amount of waste heat by modifying the applied electrical waveform in two ways:

1. The duration of the electrical power pulse ($T_w$) is selected to be substantially less than the gas ion transit time across the discharge gap ($T^+$).
2. A relatively low voltage bias potential ($V_b$) is maintained between the discharge electrodes to remove the majority of the charged gas molecules.

By selecting an extremely narrow energy pulse at the required sparking potential to produce ozone ($V_s$) it is found that the electrons which are formed are accelerated to an energy level required to do useful work. However, the energy pulse is not of sufficient duration to impart any significant waste energy to the charged gas molecules which are correspondingly formed.

It is recognized, however, that the gas ions which are present in the discharge gap must be removed before the next applied energy pulse, or a substantial portion of the energy pulse will be wasted in further acceleration of the non-productive gas ions. To achieve removal of gas ion "debris", I apply a relatively low voltage bias potential or "debris ion sweeping" potential during the interval between high energy electrical pulses. This low voltage bias potential is applied for a period which is substantially greater than the high energy pulse. However, since the energy applied to a charged particle in an electrical field is a function of only the particle charge and the field potential, the energy required to sweep the ion debris from the discharge gap is relatively minor.

The relationship which defines the preferred low voltage bias potential $V_b$ is as follows:

$$T_r V_b = T^+ V_s$$

$$V_b = T^+/T_r V_s$$

wherein $T_r$ represents the pulse repetition period, $T^+$ is the calculated gas ion transit time to sweep substantially all the gas ions from the gap at the sparking (corona discharge) potential $V_s$.

In order to determine the actual pulse width and frequency which is employed in the production of the high frequency narrow pulse energy it is necessary to select a pulse width which is substantially less than the pulse repetition period (which is the reciprocal of the frequency). In general, the actual pulse width $T_w$ is selected so as to be a small percentage of the overall pulse repetition rate $T_r$. In general it is found that in most applications the $T_w$ will be from about 0.1 to 10 per cent of $T_r$. Furthermore, it is noted that in order to produce the desired chemical reaction the pulse width should be of sufficient duration and magnitude to impart sufficient kinetic energy to electrons which produce the desired chemical reaction. Therefore, the desired narrow pulse width $T_w$ will be somewhat greater than the pulse width required to accelerate the electrons across the discharge gap, this time being referred to as $T_e$.

In order to implement my novel method and to optimize the design of the equipment and electrical circuits which are uitlized herein, it is found that the operational and circuit parameters of the system may be conveniently selected in accordance with the following consideration of a circuit which employs a conventional heated cathode vacuum switch tube type power supply.

For most heated filament vacuum tube switch devices it is well known that the optimum electrical efficiencies are obtained when a duty cycle (D) is selected which is as high as possible. That is a relationship $$D = T_w/T_r$$

is maximized commensurate with the energy losses which result in corona generation due to a pulse width $T_w$ which is necessarily larger than the electron transit time $T_e$ and substantially less than the gas ion transit time $T^+$.

To optimize the parameters of duty cycle D and pulse width $T_w$, pulse repetition time $T_r$ which is the reciprocal of the pulse frequency $f$, I have found the following relationship exists:

$$\alpha^2 = D \tag{1}$$

wherein:

$$\alpha = T_w/T^+ \tag{2}$$

and $T^+$ is the gas ion transit time which may be readily calculated for any gas ion using the well known principles typically set forth in "Gaseous Conductors" by J. D. Cobine, Dover Publications, N.Y. (1958).

Equation (1) may be rewritten $$D = (T_w/T^+)^2 \tag{3}$$

For air it is found by using the relationships provided by Cobine, that $$T^+ = (1/K_p)t_g/40 \quad (4)$$

The product $K_p$ is constant for any gas. For air $$K_p = 1064 \text{ (cm/sec)/volt/cm (m.m.Hg)} \quad (5)$$

A reasonable approximation of $T^+$ is $$T^+ = 1.83 \times 10^{-5} t_g \quad (6)$$

Accordingly, to give an example of how the operational parameters may be optimized for a corona discharge system which is operating on air to produce ozone at a pressure ($p$) of 1520 m.m. Hg absolute with a discharge gap of 0.115 cm. the following calculations are made, using equation (6) above $$T^+ = 2.10 \text{ } \mu\text{sec.}$$

The sparking voltage $V_s$ or gap potential required to produce corona is calculated from the following relationship, which appears in Cobine:

$$V_s = 40 \, p \, t_g = 40 \times 1520 \times 0.115 = 6992 \text{ volts}$$

The pulse width $T_w$ is determined using equation (2) above $$T_w = \alpha T^+$$

wherein $\alpha$ is less than 1. Furthermore, $T_w$ is selected to be somewhat greater than the electron transit time $T_e$ across the discharge gap which may be readily calculated by comparing the masses of the electron with the mass of the gas ion (oxygen) used in the calculation of the gas ion transit time $T^+$. This calculation is as follows:

$$T_e = \frac{T^+}{\sqrt{1840 \times 16}}$$

$$= 0.012 \text{ } \mu\text{sec}$$

It can be shown that the amount of power consumed in the production of ozone, that is, specific ozone yield, $S_y$, which is due to pulse width losses and pulse bias losses is approximately $$S_y = 0.6(1 + \alpha)(1 + D/\alpha)$$

and is a minimum when $$\alpha = \sqrt{D}$$

Figure 5:
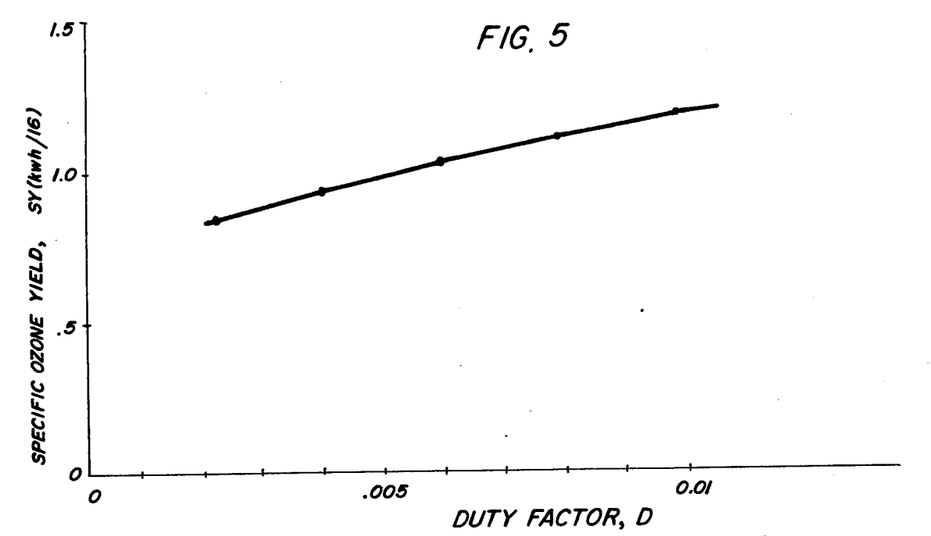
FIG. 5 is a plot in which specific ozone yield is plotted on the vertical scale versus duty factor on the horizontal scale, which may be used to select certain preferred operational parameters of the present system.

Accordingly $$S_y \text{ (min)} = 0.6 \left(1 + 4\sqrt{D}\right)^2$$

$$= 0.6 \, (1 + 4\alpha)^2$$

and if $S_y$ in KWH per pound of ozone produced is plotted against D, the duty factor, a curve such as is shown in FIG. 5 results. From FIG. 5 it is seen that D should be as low as possible to obtain the lowest ozone specific yield $S_y$ in terms of KWH/lbs. $O_3$ produced as far as the pulse geometry is concerned.

Figure 6:
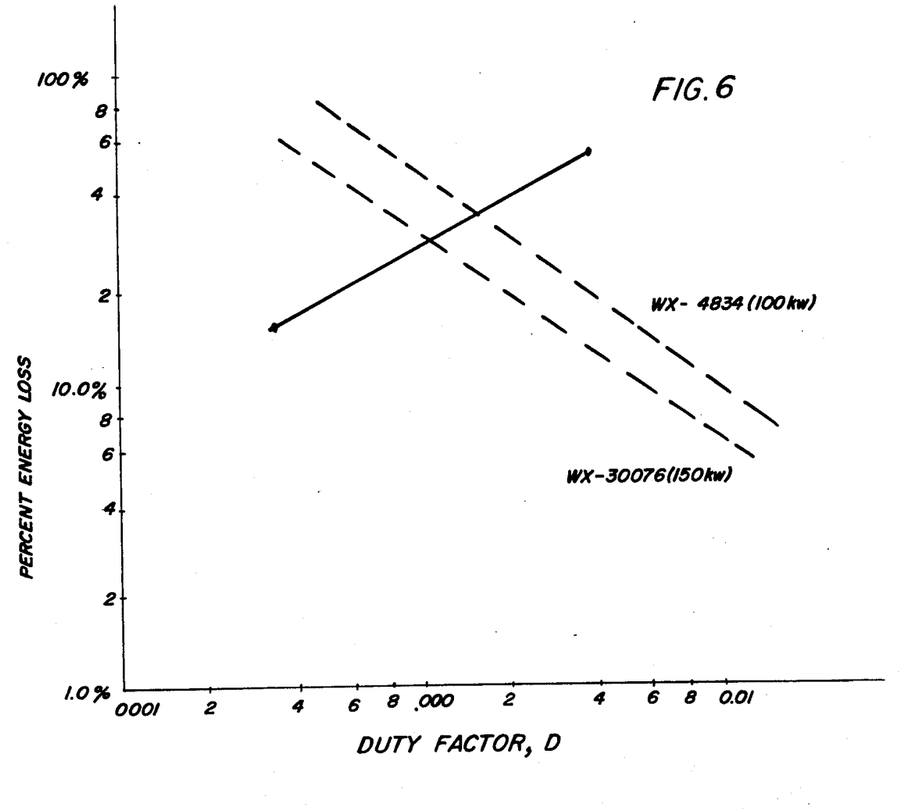
FIG. 6 is a plot in which percent energy loss is plotted on the vertical scale versus duty factor on the horizontal scale, which may be used to select certain preferred operational parameters used in the practice of the present invention.

To select a specific value for the duty cycle D when using a typical heated cathode vacuum tube power supply circuit wherein the vaccum tube filament loss is of primary consideration, a plot such as is shown in FIG. 6 is prepared. In FIG. 6 the duty factor D is plotted as a solid line against the per cent energy loss which is atrributed to pulse geometry (which may be readily determined from FIG. 5). Also plotted are a series of broken lines in FIG. 6 which represent the per cent energy loss due to filament heating in two typical vacuum tube switch devices rated at 100 and 150 KW respectively. It is seen from FIG. 6 that the preferred duty cycle D for the 150 KW tube is about 0.901 and it is at approximately that point where the tube filament loss is equal to the pulse geometry, that is, process, loss.

When the duty cycle D has been chosen to be 0.001 $\alpha$ is calculated as follows:

$$\alpha = \sqrt{D}$$

$$= \sqrt{0.001}$$

$$= 0.0317$$

From $\alpha$ and $T^+$ the desired pulse width $T_w$ and frequency $f$ may be calculated as follows:

$$T_w = T^+$$

$$= 0.0317 \times 2.09 = 0.066 \text{ } \mu\text{sec.}$$

and $$f = 1/T_r = D/T_w$$

$$= \frac{0.001}{0.066} = 15100 \text{ Hz}$$

To determine the preferred low voltage bias potential $V_b$ which is used to remove positively charged gas molecules from the discharge gap between pulses, the following relationship is used:

$$V_b = T^+/T_r \, V_s \text{ and } T_r = 1/f = 1/15100$$

$$V_b = 2.09/15100 \times 6975$$

$$= 315 \text{ v.}$$

Figure 1:
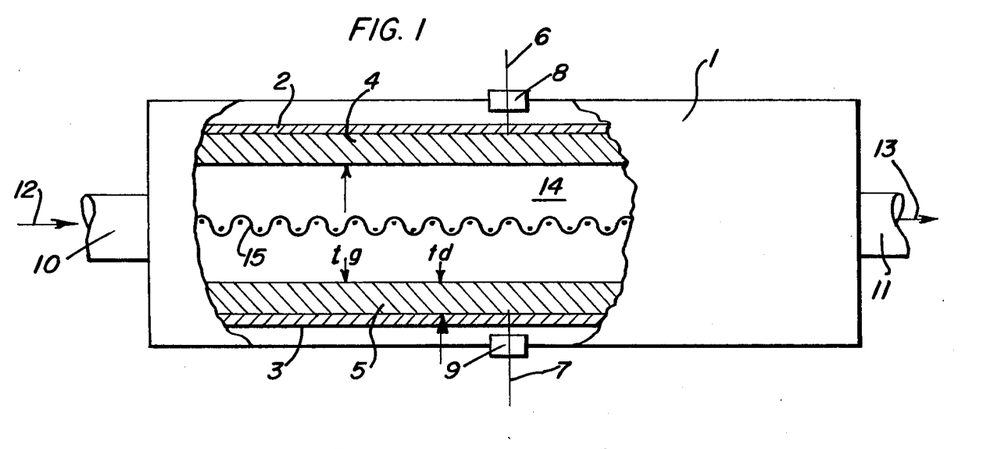
FIG. 1 represents a cross-sectional view with parts broken away of a typical corona discharge cell which may be used in the practice of the present invention.

In accordance with the above calculations, it is seen that the preferred operational parameters may be summarized as follows:
D = 0.001
$V_s$ = 6975 v
$f$ = 15100 Hz
$V_b$ = 315 v A more clear understanding of the present invention may be obtained by reference to the drawings in which FIG. 1 is a cross-sectional view of a corona cell with parts broken away which may be used in the corona reactions systems contemplated herein. The corona reaction cell FIG. 1 includes a gas tight housing 1 in which are placed two opposing electrodes 2 and 3. Between electrodes 2 and 3 are placed dielectric plates 4 and 5, the inner surfaces of which define a corona discharge gap having a thickness $t_g$, as indicated in FIG. 1. The dielectric plates 4 and 5 possess a thickness td, the actual dimension of which is enlarged considerably for purposes of clarity. Likewise, the dimension $t_g$ is considerably expanded in the drawing for purposes of clarity. Typically, the dielectric thickness, $t_d$, may range as small as 0.1 mm and in certain instances may be as large as 24 to 50 mm. The discharge gap tg may range from about 0.1 to 50 mm.

The electrode plates 2 or 3 are connected to an external power source through conductors 6 and 7 respectively, which enter the housing 1 through insulated bushings 7 and 8. While in the present drawing it is shown that the electrodes 2 and 3 are not in contact with the housing 1, it is found that in actual practice if the housing 1 is constructed of essentially electrically non-conducting material, the electrode plates may be in contact therewith. Furthermore, it is found in actual practice that either of the electrodes 2 or 3 may be grounded, and in the event the housing is constructed of conductive material, may support either of the electrodes.

As shown in FIG. 1, reactant gas enters the housing 1 through conduit 10 and the reactant product exits through conduit 11. The arrow 12 indicates direction of flow into the housing 1, while arrow 13 indicates the direction of the existing reaction products. Furthermore, in FIG. 1, 14 indicates the corona discharge zone which is defined between the electrodes 2 and 3 and the dielectric plates 4 and 5. While the present drawing shows the use of two dielectric plates, each of which is essentially in contact with the opposing electrodes 2 and 3, it should be understood that devices wherein the electrode plates are spaced from the electrodes, or wherein a single dielectric plate is located between, may also be utilized. In practice it is found that satisfactory results may be obtained when the dielectrics are constructed of materials having good dielectric qualities, that is dielectric strength of from about 100,000 to 1,000,000 volts per cm, such as glass. It is also found that extremely thin dielectric layers formed from fired on porcelain enamel coatings having a thickness of from about 0.1 to 0.5 mm produces particularly satisfactory results.

Also shown in FIG. 1 is a grid 15 which is optionally placed between electrodes 2 and 3. In some instances it is found to be advantageous to apply a relatively low bias potential to the grid 15 for purpose of eliminating heavy gas ions from the reactant gas stream. While a single screen type grid 15 is shown in FIG. 1, it is contemplated that a series of grids may be provided which may be energized to provide a selective ion neutralization electrical field in the gap 14.

Figure 2:
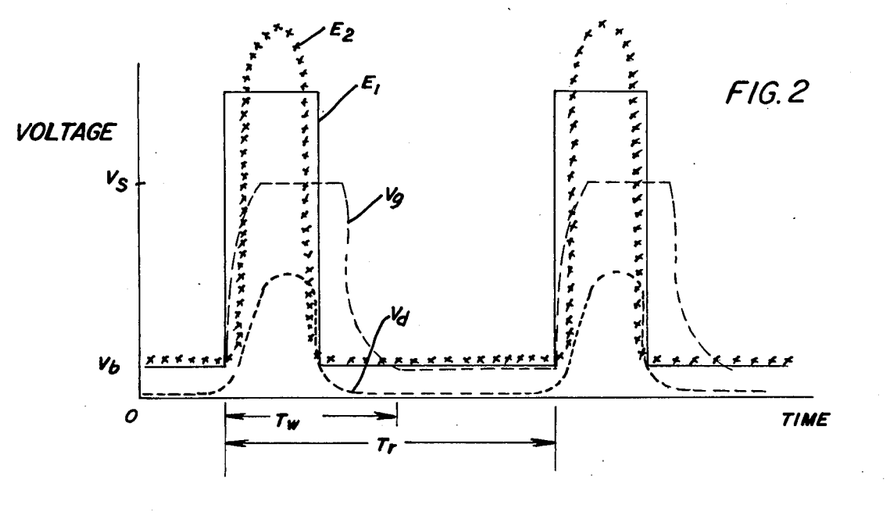
FIG. 2 is a graphic representation wherein supplied, applied, dielectric and gap voltages are plotted on the vertical axis versus time on the horizontal axis, and represents the preferred waveform of the electrical energy pulses used to generate corona discharge.

FIG. 2 shows in graphic idealized form the shape of the desired narrow electrical power pulses which are used in the practice of the present invention. It is noted in FIG. 2 that 4 curves are plotted, with voltage on the vertical axis and time on the horizontal axis. The curve $E_1$ (set forth as a solid line) represents the voltage of the preferred square wave pulse which is initially produced most efficiently by the high speed switch device of a suitable power supply. The curve $E_2$ (shown as a series of X's) represents the voltage of the initial power pulse $E_1$ after passing through a suitable inductance which has a value selected to minimize the power loss which normally results from the charging of a resistance-capacitance circuit. $E_2$ is the power pulse which is applied to the electrodes of the corona cell shown in FIG. 1. The curve $V_g$ (dashed line) represents the voltage which appears across the discharge gap 14 of the corona cell and has a maximum value of $V_s$ which is the sparking or ionization potential of the gap. $V_g$ has a lower value of $V_b$ which is the bias potential, a pulse width of $T_w$ and a repetition period of $T_r$. The curve indicated as $V_d$ (dotted line) is the valve of the potential which appears across the dielectrics of the corona cell. As will be discussed herein an understanding of the various preferred voltage wave forms which appear at various points in the corona cell will provide a basis by which one skilled in the art may design a circiut suitable for practice of the present invention.

While the preferred waveform shown in FIG. 2 indicates the pulses to be monopolar, it is to be understood that bipolar pulses in which each succeeding pulse is of alternating polarity may also be utilized. It is to be also understood that while FIG. 2 shows the bias potential to be greater than 0, that is a + bias potential, it is found that $V_b$ may also be utilized in the form of a negative bias potential, that is, a value less than 0. Furthermore, it is shown that $V_b$ is essentially constant in the waveform shown in FIG. 2. It should be understood that $V_b$ may be either increasing or decreasing between power pulses, that is, $V_b$ does not necessarily have to remain constant, and in fact may alternate to some extent.

The waveform shown in FIG. 2 may be produced by a variety of well known high voltage power supplies which utilize high speed switch devices such as solid state transistors, silicon controlled rectifiers, varactors, vacuum tubes of both the heated filament and non-filament types, such as thyratrons and ignitrons, as well as high speed mechanical switches.

Figure 3:
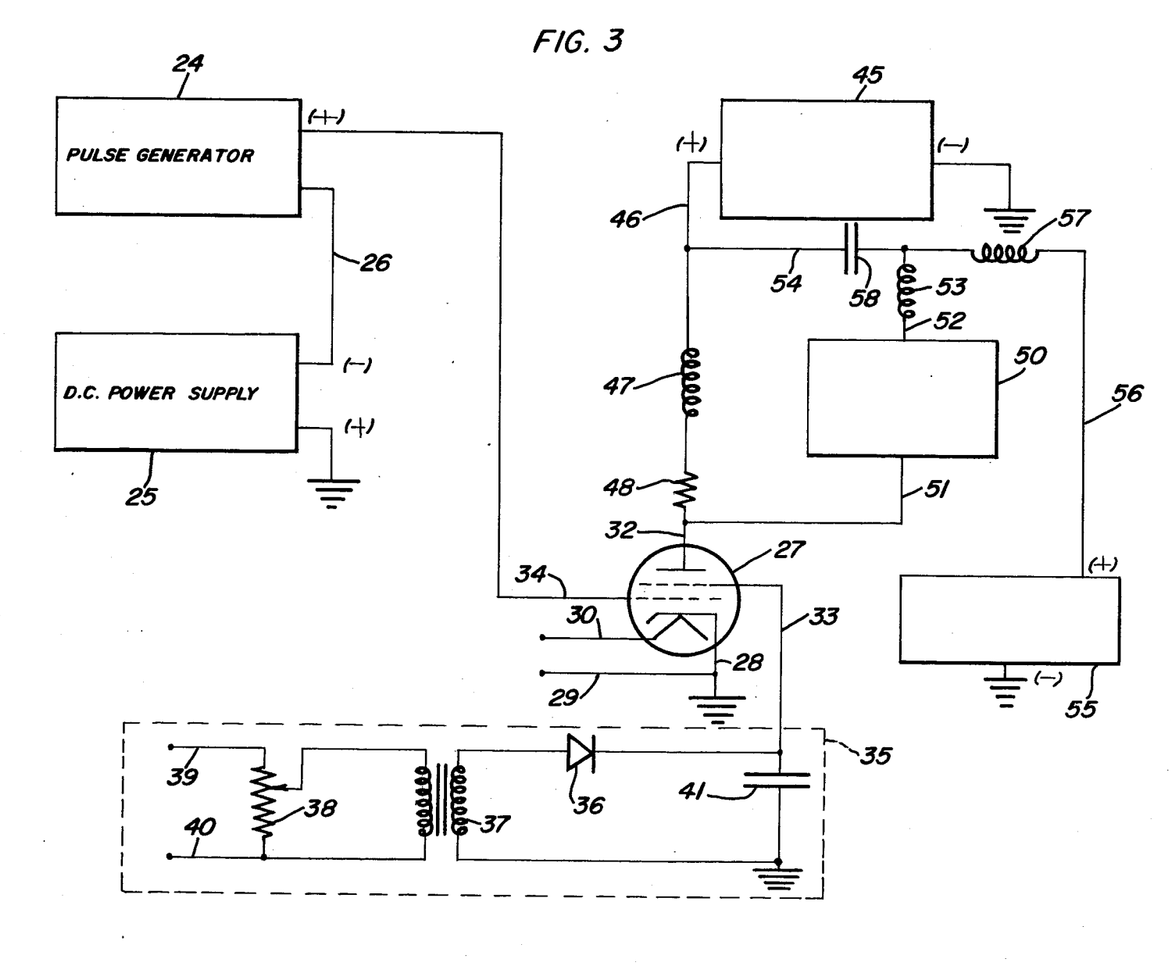
FIGS. 3 and 4 are circuit diagrams of preferred power supplies which may be used to obtain the desired corona discharge.
Figure 4:
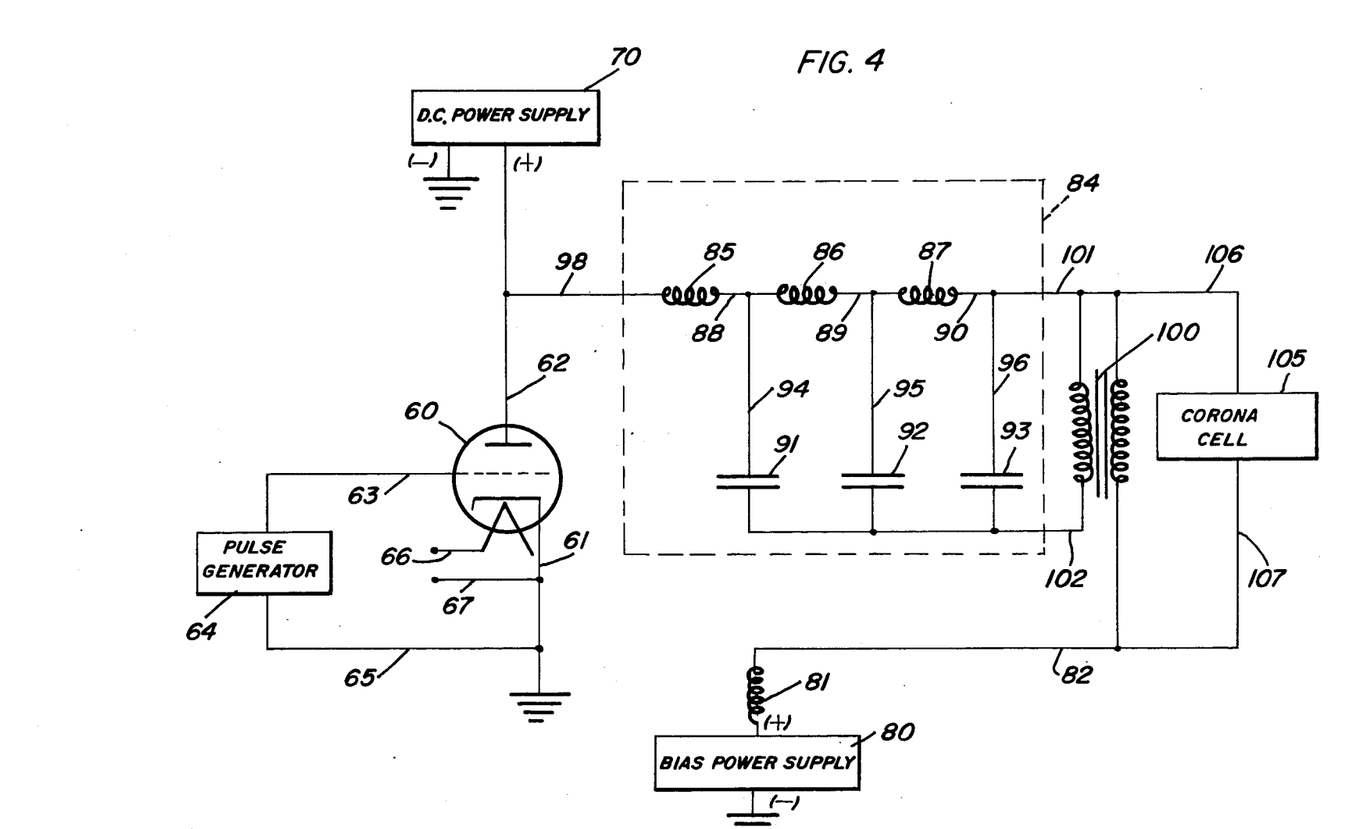

In FIGS. 3 and 4 two typical circuits are disclosed which use heated cathode vacuum switch tubes. It is to be understood, however, that the use of nonfilament switch devices such as thyratrons and ignitrons have substantially no standby power losses and use thereof enables the operation of a more efficient process.

Reference to FIG. 3 reveals a corona generation system which includes a power supply of the typical vacuum tube amplifier type. In FIG. 3 a pulse generator 24 is connected to a DC power supply by means of electrical conduit 26. Pulse generator 24 is typically a commercial pulse generator unit such as is sold by Cober Electronics Inc., which is capable of producing pulses of a voltage up to 300 volts at frequencies ranging from 1 Hz to 3 MHz. The pulse generator 24 typically comprises a trigger circuit in combination with suitable vacuum tube amplifier stages. The DC power supply 25 is also commercially available and typically produces from about 0 to +3000 volts DC at a power level of up to 10 KW.

Pulse generator 24 is used to control the output of vacuum switch tube 27. Vacuum switch tube 27 is a typical heated cathode tetrode device which is readily commercially available. Tube 27 includes a heated cathode 28 which is connected to a source of power by leads 29 or 30. Typically the heating power means, not shown, range from about 4 to 40 volts. The vacuum tube 27 is provided with a plate lead 32, a secondary grid lead 33 and a primary grid lead 34. The secondary grid 33 is connected to a source of bias potential which is confined within broken line 35. The bias potential supply comprises a diode 36 which is connected to a power transformer 37 which in turn is supplied through a variable resistance 38 by means of power leads 39 and 40 which are connected to a convenient 60 cycle AC source, not shown. The bias potential means 35 also includes a capacitance 41 which serves to even out the output thereof.

The switching grid 34 of the vacuum tube 27 is connected to the pulse generator 24. The plate lead 32 is connected to a DC power supply 45 through a conductor 46 which is connected to an inductance coil 47 in series with a resistance 48. The DC power supply 45 is also connected through conductor 46 and conductor 54 in series with conductance coil 53 and conductor 52 to a corona cell 50. The coil 53 "spreads out" the square generated waveform such to minimize the energy loss normally associated with charging up a capacitor (cell capacitance in this case) through a charging resistor. In general, the value of the preferred inductance of the coil 53 is obtained by the readily recognized relationship $$L = t_w^2/\pi C$$

A power supply 55 may be used to supply a bias potential to the plates of corona cell 50 through conductor 56 and inductance 57 which connect through inductance 53 and conductor 52. The capacitance 58 serves to isolate a DC bias voltage from the remainder of the power supply circuit. In the event the bias potential is supplied through the switch tube 27, the power supply 55 may be eliminated. The corona cell 50 is typically constructed in the manner shown in FIG. 1. The circuit through the corona cell 50 is completed by conductor 51 which is connected to the gate lead 32.

In operation the device of FIG. 3 requires that the output of DC power supply 45 be switched at a desired frequency which is produced by the pulse generator 24, which in turn is powered by the DC power supply 25. Typically, the DC power supply 45 is adjusted to operate about 5000 to 30,000 volts DC. The positive output side of the DC power supply 45 is applied to the corona cell as shown through the inductance 53 which typically has a value of 1.0 to 10.0 microhenry. The positive side of the power supply 45 also appears as being applied to the gate lead 32 through the inductance 47 which has a value of 0.1 to 1.0 henry and through the resistance 48 which has a value of 100 to 100,000 ohms. It is noted that switching of the output of vacuum tube 27 by means of the grid 34 which is connected to the pulse generator 24 produces a narrow high frequency pulse to appear across the plates of the corona cell 50. Typically, the pulse generator 25 is operated at a frequency of from 0.1 to 100 KHz. Also, for vacuum switch tubes of appropriate design the grid 33 of the power tube 27 is maintained at a suitable potential from about +50 to +500 volts so that a bias voltage of about 10 to 5000 volts may be maintained across the plates of the corona cell 50. Other methods of supplying a low pulse to pulse bias are possible, as shown in FIG. 4. In this manner the operational parameters of the corona cell in terms of frequency, bias voltage, sparking voltage and pulse width may be conveniently selected within the limits indicated by the present invention. The circuit of FIG. 3 is classically called a hard tube modulator.

Another suitable type of power supply is shown in FIG. 4, wherein a triode type vacuum switch tube 60 includes a heated cathode 61, a plate 62 and a grid 63. This is a classical line pulser type modulator. The grid 63 is connected to a pulse generator 64 and a grounded conductor 65 which is also connected to the cathode 61. The cathode 61 is provided with heater leads 66 and 67 which are connected to a suitable source of power, not shown.

A high voltage DC power supply 70 is connected through its positive lead to the cathode lead 62 of the switch tube 60. The negative side of the DC power supply 70 is grounded. A DC bias voltage power supply 80 is negative grounded and the positive lead thereof is connected through an inductance 81 to conductor 82.

The DC power supplies 70 and 80 as well as the switch to circuit is connected to a conventional pulse forming network which is confined within the broken line 84 and includes selected inductances 85, 86 and 87 which are connected in series with each other through conductors 88, 89 and 90. Also included in the pulse forming network 85 are capacitances 91, 92 and 93 which are respectively connected to the conductors 88, 89 and 90 by means of conductors 94, 95 and 96. The pulse forming network 84 is connected to the DC power supply switch circuit by means of conductors 95 and 98. The output of the pulse forming network 84 is connected through to the primary side of a step-down transformer 100 by means of leads 101 and 102. The step-down transformer secondary is connected to a corona cell 105 by means of conductors 106 and 107. The step-down requirement is necessary at power levels greater than a few kilowatts. It is found to be impractical to build step-up pulse transformers with the required characteristics of band width, inductance, etc. at higher power levels. Step-down transformers are possible, however. The output of the bias power supply 80 is supplied to the corona cell 105 through the conductors 82 and 107.

In operation the system of FIG. 4 is adjusted so that the power supply 70 produces a voltage from about 10,000 to 100,000 volts DC which appears across the plate 62 of switch tube 60 and one side of pulse network 84. The DC power supply 80 is adjusted to provide a voltage of from about 10 to 10,000 volts DC which appears across the electrodes of corona cell 105. The pulse generator 64 is adjusted to provide a frequency output in the range of 0.1 to 200 KHz at a voltage of from about 100 to 10,000 v.

In the pulse forming network 84 the inductances 85, 86 and 87 are selected to have a value of from about 1.0 to 1000 microhenry, while the capacitances 91, 92 and 93 are selected to have a value of from about $10^{-6}$ to 1 microfarads. It is seen that by pulsing the pulse forming network from the switch tube circuit the output of the pulse forming network appears across the stepdown transformer 100. Since the transformer 100 is of a step-down type, preferably the primary to secondary winding ratio will have a value of from about 1:2 to 1:100 and it is seen that the inductance characteristics of the power supply may be readily matched to those of the corona cell.

In one preferred practice of my invention a reaction system is utilized wherein a reactant gas stream is passed through a corona reaction gap in which narrow pulse electrical power is dissipated in the gap at a frequency such that the reactant gas is subject to a limited number of corona pulses, preferably not more than about 5 to 100 electrical pulses prior to removal from the gap. The gas is then preferably held in a non-corona zone or receiver for sufficient time to permit recombination of the heavy gas ions. Preferably the reactant gas is held under positive pressure to increase the rate of recombination.

As indicated above, the duration and magnitude of the power pulse is sufficient to accelerate electrons to produce a desired chemical reaction but is substantially less than the time required for a gas ion to be accelerated to a level where appreciable energy is dissipated thereon. The reactant gas is preferably maintained at a high rate of flow through the corona discharge gap so that gas ions formed during given corona pulses are removed, that is, "swept", from the gap by movement of the reactant gas stream prior to being subjected to subsequent corona pulses. In this manner the charged gas molecules or ions are not accelerated by successive energy pulses to a point wherein a substantial amount of kinetic energy is imparted thereto, which in turn is dissipated as waste heat.

Figure 7:
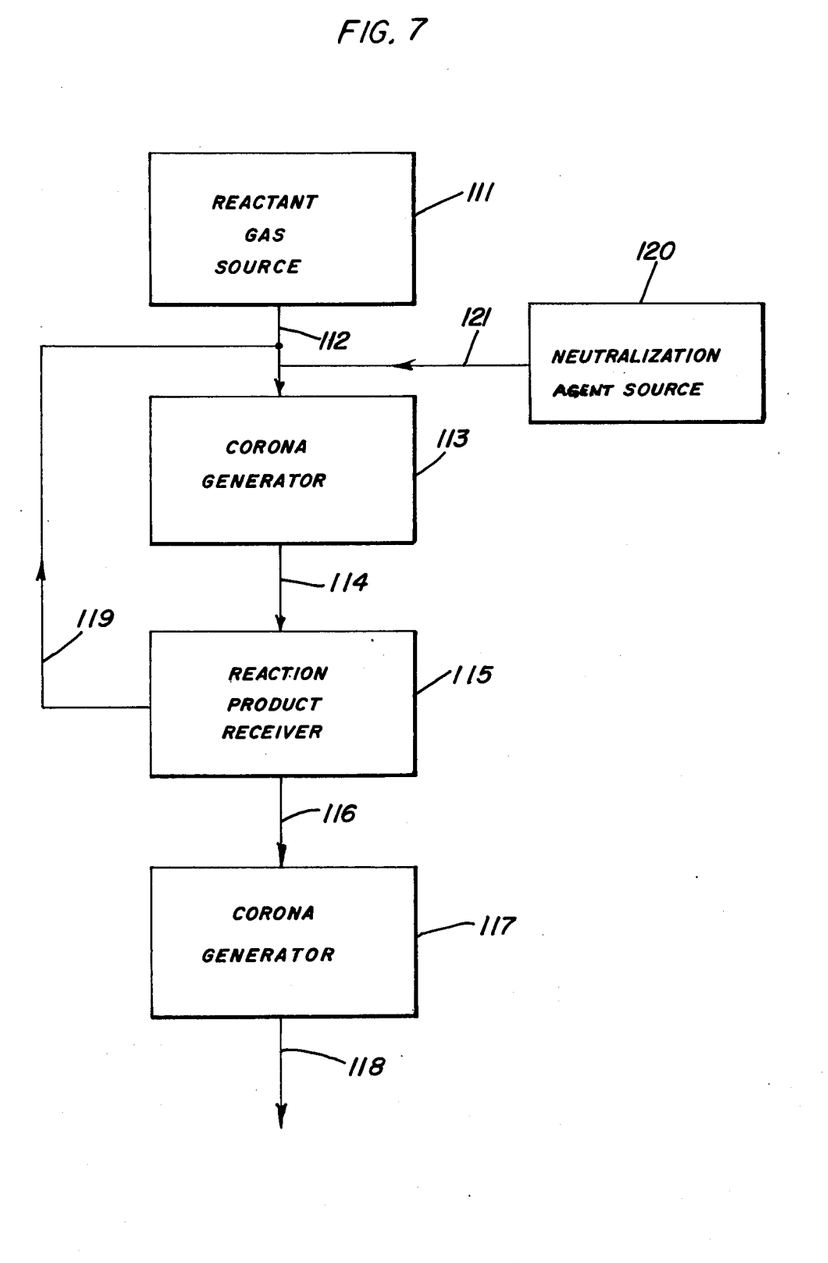
FIG. 7 is a block process diagram which illustrates preferred methods for practicing the present invention.

A more clear understanding of my present invention may be obtained by reference to FIG. 7, which comprises a block diagram which represents preferred methods for practicing the present invention. In FIG. 7, 111 represents a reactant gas source such as an oxygen-containing gas when it is desired to produce ozone, which is connected by means of conduit 112 to a corona generator 113. Preferably, the corona reaction zone of generator 113 is short with respect to gas flow, that is, the width to length ratio is greater than 2 to 1 and preferably up to 100 to 1 with respect to the direction of gas flow. The reactant gas provided at 111 is under pressure sufficient to cause the desired rate of flow through the generator 113. Corona generator 113 is in turn connected by means of conduit 114 to a reaction product receiver 115. The reaction product receiver 115 is in turn connected by means of a conduit 116 to a second corona generator 117, which in turn is provided with an outlet conduit 118. The use of the second corona generator 117 is optional and is utilized when it is desired to produce a high concentration of desired reactant species and the reaction product. It is also to be understood that more than 2 corona generators may be utilized, as long as an additional receiver accompanies each additional corona generator.

FIG. 7 also shows another alternative preferred practice of the present invention, wherein the reaction product contained in the reaction product receiver 115 may be recycled by means of counduit 119 through the corona generator 113. This recycle feature, which is optional, is utilized to produce a higher concentration of ozone or reactant product than would normally be produced by a once-through pass through the corona generator.

The use of the reaction product receiver 115 in addition to providing means for storing the reaction product which exits from a given corona generator, such as 113, may provide the additional function of holding the gas for an interim period between exposure to corona to permit recombination of positive and negative charged particle ion debris which is produced at any given corona generation step. Furthermore, the corona reaction product receiver 115 may be provided with cooling means to provide a method for eliminating or removing any excess heat which may be formed.

As indicated above, the present invention contemplates the use of multiple corona generators which are preferably provided with interim reaction product holding means so that the reaction product of any given corona generator may be permitted to stand prior to being subjected to additional treatment by corona. The present method may also be practiced using a single corona generator, particularly when it is desired to produce a reaction product containing only a small quantity of the desired product.

FIG. 7 also describes another preferred practice of my invention wherein heavy gas ions are managed, that is, neutralized, by the addition of a neutralizing particulate solid or liquid component. In FIG. 7 a neutralization component source 120 is connected to the connecting conduit 112 by means of a conduit 121.

In operation, a neutralizing component comprising negatively charged particles of a finely divided solid or liquid such as silica gel, carbon black or water in the size range of about 0.001 to 0.1 micron is supplied from the source 120 as shown in FIG. 7 and metered through the conduit 121 into the feed gas stream. The amount of neutralizing component added is approximately that amount which will provide a negative charge for each positively charged gas ion present in the corona discharge gap.

In a typical preferred practice of the invention a water aerosol is added as the neutralizing agent in an amount to provide a water to ozone weight ratio of about 25. To arrive at this estimate, it is assumed that in producing 2 percent ozone from oxygen feed, one free accelerated electron produces about 500 ozone molecules. If water is added to the oxygen feed gas as droplets having a diameter of 0.01 micron, it is calculated that one droplet will weigh $10^{-19}$ g and comprise $0.3 \times 10^5$ water molecules. Since each electron (which is assumed to produce about 500 ozone molecules) results in the formation of one positively charged gas ion, it is reasoned that 60 water molecules, that is $$\frac{NH_2O}{NO_3} = \frac{0.3 \times 10^5}{500} = 60,$$

are required per ozone molecule. On a weight basis, it is calculated that 1 part by weight of ozone requires about 25 parts by weight of water to produce the desired result, that is $$\frac{NH_2O}{NO_3} \times \frac{Mol.\ Wt.\ H_2O}{Mol.\ Wt.\ O_3} = 60\left(\frac{18}{48}\right) = 25$$

The finely divided water may be conveniently added to the reactant gas stream in the form of an aerosol obtained from saturated steam. It is estimated that where the feed gas is used to produce 2 percent by weight ozone, sufficient moisture (steam) should be added to yield a feed gas having about a +175° F dewpoint.

The required negative charge may be imparted to the finely divided neutralization component by passing a finely divided liquid or solid aerosol through a charged electric field. Commercially available equipment which is used in electrostatic paint spraying or electrostatic precipitation of solids may be used to induce the desired charge on the particles. Typically, the charged particles may be produced by passing an aerosol thereof between opposed plates which are charged to a potential below the sparking potential and preferably of about 500 to 30,000 volts AC or DC per cm of plate separation.

I claim:

1. A method for conducting corona discharge reactions between spaced opposing electrodes each having an exposed dielectric surface having a thickness of from about 0.1 to about 10.0 mm and a dielectric constant of from about 2.0 to about 200 relative to vacuum; and a dielectric strength sufficient to withstand applied voltage for forming therebetween a corona discharge gap comprising:

passing a reactant gas through said corona discharge gap:

periodically establishing a corona discharge between said gap by dissipating narrow pulse electrical power of high voltage in said gap with the width of said pulses being relatively small compared to the pulse period as well as being less than the gas ion transit time across said gap and greater than the electron transit time across said gap; and removing gas ions from said gap before termination of each pulse period.

2. The method of claim 1 wherein said narrow pulses have a peak voltage of from 2 to 200 K volts and wherein the pulse period is selected from between 0.1 to 200 KHz.

3. The method of claim 2 wherein said reactant gas comprises oxygen.

4. The method of claim 3 wherein said pulses are of the same or alternating polarity.

5. The method of claim 1 wherein said gas ions are removed by withdrawing said reactant gas from said gap to permit recombination of said gas ions prior to exposure of said reactant gas to subsequent corona discharge.

6. The method of claim 5 wherein said reactant gas is exposed to less than about 100 pulses prior to removal from said gap.

7. The method of claim 6 wherein said gap has a width to length ratio of from about 2:1 to 100:1 with respect to the direction of gas flow.

8. The method of claim 6 wherein said gas is exposed to 5 to 100 pulses prior to such removal.

9. The method of claim 8 wherein said gas is subjected to two or more of said exposures to corona.

10. The method of claim 9 wherein said gas is held for a period of about $10^{-3}$ to $10^{-2}$ seconds before a subsequent exposure to said corona pulses.

11. The method of claim 10 wherein said removed gas is cooled prior to subsequent exposure to corona.

12. The method of claim 1 wherein said gas ions are removed by application of a negatively charged gas ion neutralizing component.

13. The method of claim 12 wherein said neutralizing component is selected from the group consisting of finely divided solid particles and liquid particles having a particle size of less than about 0.1 micron.

14. The method of claim 13 wherein said liquid particles comprises water supplied in the form of a water aerosol in an amount to provide a water to ozone weight ratio of about 25.

15. The method of claim 13 wherein said finely divided solid particles are selected from the group consisting of silica gel and carbon black.

16. The method of claim 1 wherein said gas ions are removed by selecting the width of the narrow pulses from about 1 to 50 percent of the singly charged gas ion transit time.

17. The method of claim 1 further comprising introducing a grid between said spaced electrodes and applying a potential to said grid.

* * * * *

UNITED STATES PATENT OFFICE
CERTIFICATE OF CORRECTION

Patent No. 4,038,165            Dated July 26, 1977

Inventor(s) Frank E. Lowther

It is certified that error appears in the above-identified patent and that said Letters Patent are hereby corrected as shown below:

Column 2, line 58, "expanded" should be
-----expended-----

Column 6, line 13, "0.901 should be
-----0.001-----

Column 7, line 8, "or" should be
-----and-----

Column 10, line 38, "weork" should be
-----work-----

Signed and Sealed this

Eleventh Day of April 1978

[SEAL]

Attest:

RUTH C. MASON          LUTRELLE F. PARKER
Attesting Officer      Acting Commissioner of Patents and Trademarks